11/3/87 OR 4,704,732

United States Patent [19]
Csonka
[11] Patent Number: 4,704,732
[45] Date of Patent: Nov. 3, 1987

[54] METHOD OF SUSPENDING A PLATFORM FOR COMMUNICATIONS AND OBSERVATION KEPT AT HIGH ALTITUDE BY ATMOSPHERIC MOLECULAR MOMENTUM TRANSFER

[76] Inventor: Paul L. Csonka, 105 E. 39th Ave., Eugene, Oreg. 97405

[21] Appl. No.: 842,541

[22] Filed: Mar. 21, 1986

Related U.S. Application Data

[63] Continuation of Ser. No. 592,404, Mar. 22, 1984, abandoned.

[51] Int. Cl.[4] .................... H04B 7/185

[52] U.S. Cl. .................... 455/12; 343/705; 60/203.1

[58] Field of Search .................... 455/12; 343/705, 706, 343/708; 60/641.8, 641.13, 641.14, 641.15, 204, 200.1, 203.1; 244/1 R, 34 R, 168, 173; 356/216

[56] References Cited

U.S. PATENT DOCUMENTS

| | | | |
|---|---|---|---|
| 454,719 | 6/1891 | Deshler | 356/216 |
| 3,114,517 | 12/1963 | Brown | 343/208 |
| 3,206,925 | 9/1965 | Schiff | 60/203.1 |
| 3,542,316 | 11/1970 | Hant | 60/203.1 |
| 4,253,190 | 2/1981 | Csonka | 455/12 |

OTHER PUBLICATIONS

Henry, George F., "Radiation Pressure", in Scientific American; Jun., 1957, pp. 99-108.

*Primary Examiner*—Louis J. Casaregola
*Attorney, Agent, or Firm*—Cushman, Darby & Cushman

[57] ABSTRACT

The instant invention comprises a method for freely suspending without any solid material support, a platform in an atmosphere by atmospheric-particle-momentum transfer having opposite surface portions which are structured to have different atmospheric-particle-momentum-transfer characteristics determined by temperature and surface structure. Electromagnetic radiation is transmitted from an antenna with the platform disposed in the atmosphere so that the radiation impinges the platform. A temperature difference between at least one surface portion of the platform and the atmosphere adjacent that surface portion is established by regulating the temperature distribution on the surface of the platform by heating at least one surface portion by the impinging radiation. The net force produced on the platform freely suspends the platform in the atmosphere. The center of mass of the platform is located below the point of attack of the resultant force generated by the net atmospheric particle momentum transfer and the altitude is controlled by varying the intensity of the radiation impinging the platform. The platform surface structure includes, on one surface, indentations which increase the average number of particle collisions as compared to the structure on the other surface. The platform may be in the form of an inverted dish with a stabilizing weight, the dish may be solid or formed of generally intersecting ribbons. Further, the structure between opposite surfaces of the platform may include insulation or materials producing resonance between the layers by the impinging radiation.

24 Claims, 11 Drawing Figures

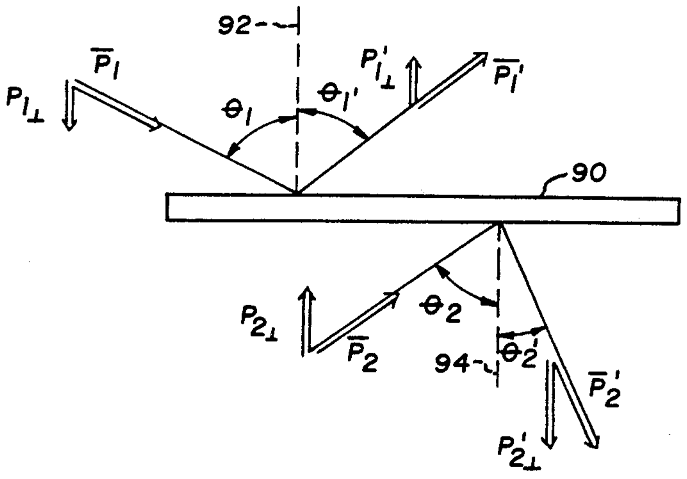
Fig. 1
Fig. 2
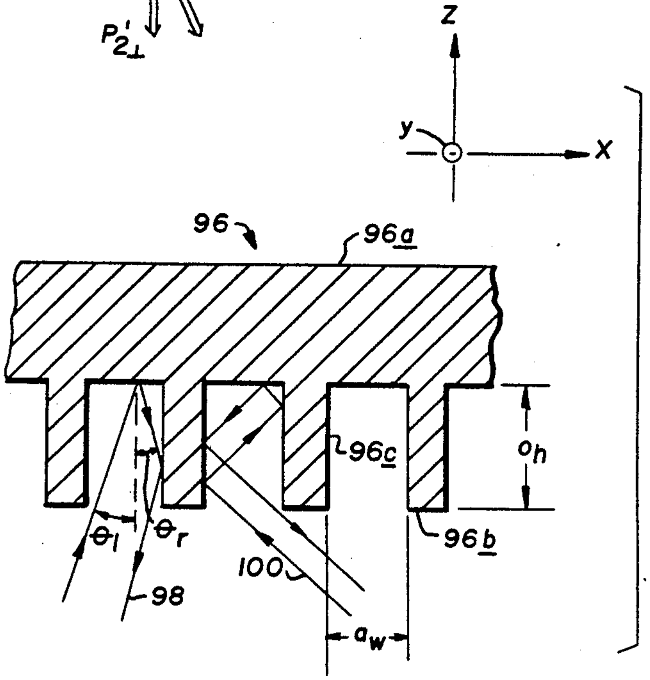
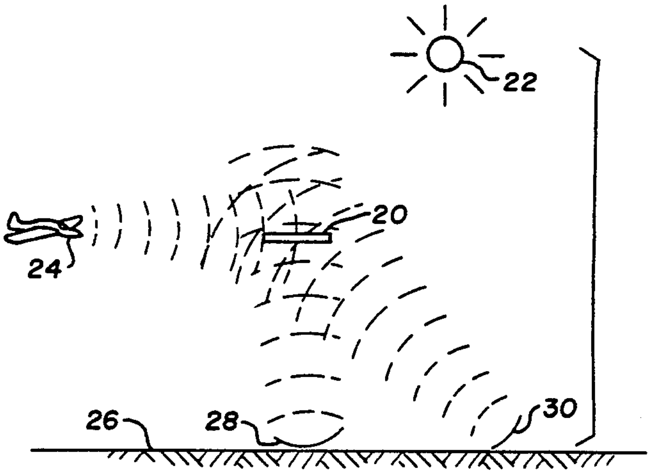
Fig. 3

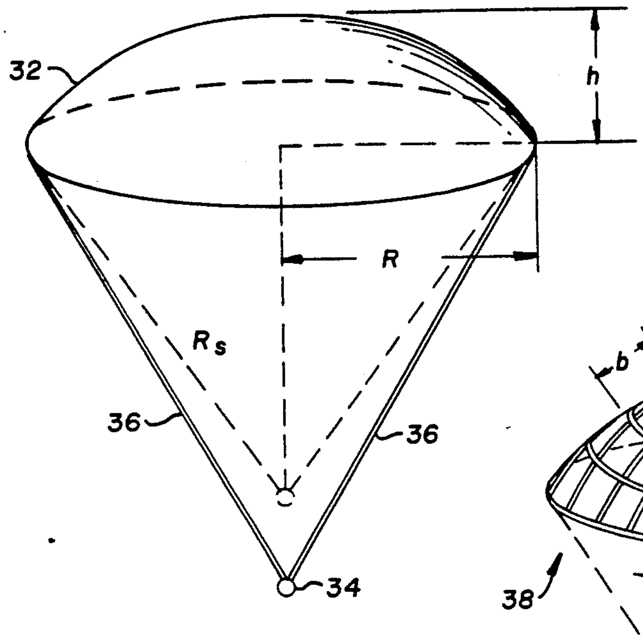
Fig.4
Fig.5
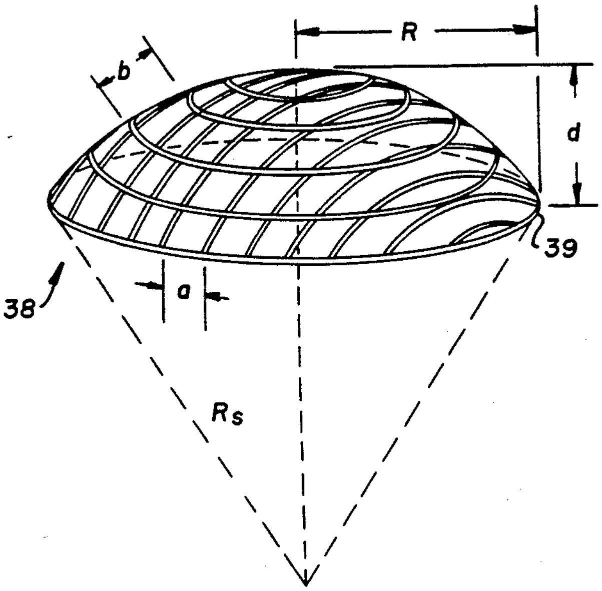
Fig.6
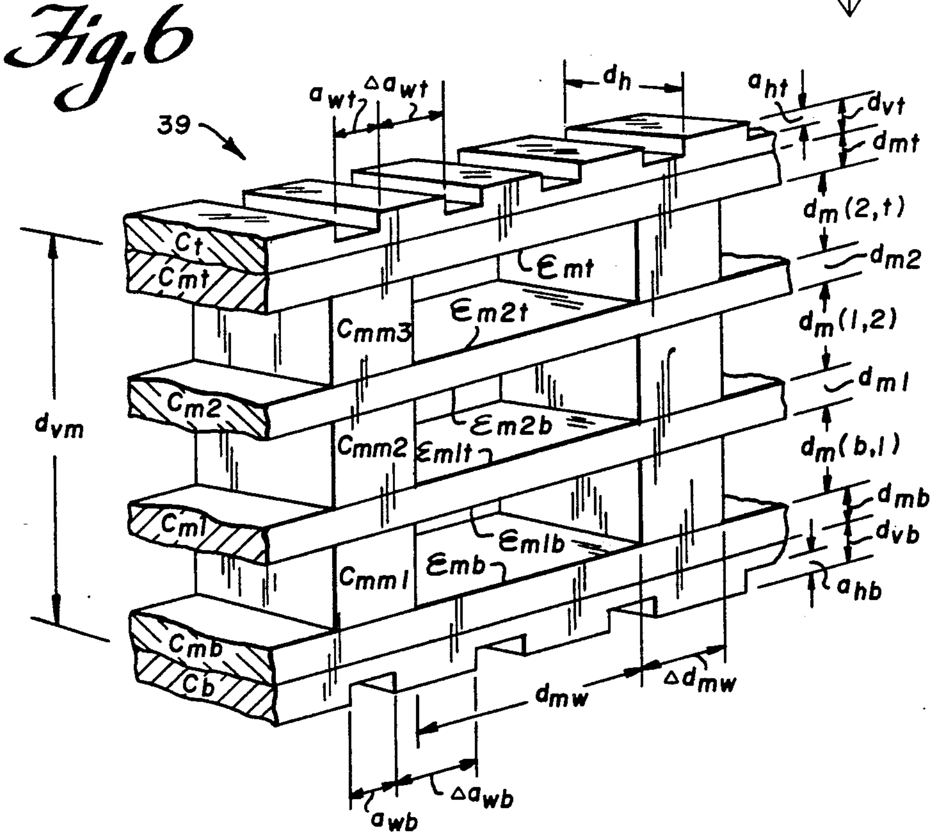

METHOD OF SUSPENDING A PLATFORM FOR COMMUNICATIONS AND OBSERVATION KEPT AT HIGH ALTITUDE BY ATMOSPHERIC MOLECULAR MOMENTUM TRANSFER

This is a continuation of application Ser. No. 06/592,404, filed Mar. 22, 1984 (abandoned).

BACKGROUND AND SUMMARY OF INVENTION

This invention relates to a platform to be maintained at high altitudes by a net momentum transferred to the platform by atmospheric particles.

The purpose of the platform is to receive and to emit electromagnetic waves, as well as to carry light weight instruments. These instruments may, for example, perform atmospheric observations, or receive electromagnetic signals.

Since the platform is located at high altitudes, it can emit signals to, and receive signals from areas of the earth which lie well beyond the horizon of an observer located on the surface of the earth directly below the platform. Therefore, an instrument carried by the platform can observe areas well beyond that same horizon. Additionally, since the platform is located above much of the atmosphere, particularly its densest layers, an instrument carried by the platform can perform astronomical observations without interference from those layers.

The quality of communication by electromagnetic waves is generally enhanced if the emitter is in the direct line of sight of the receiver. The area within which direct line of sight communication is possible with a given emitter, is larger if the emitter is located higher above the surface of the earth. Therefore, one way to extend the area of good reception from a given television emitting antenna, is to locate the antenna on a tower. However, the height of towers is limited. To achieve larger areas of good television reception, one has to use relay stations, cables or earth orbiting satellites. The present invention provides an alternative: a platform suspended in the atmosphere by a net atmospheric particle momentum transfer. The purpose of the platform is the reception and emission of electromagnetic waves, such as television waves.

Surveys of large areas of the surface of the earth are useful for a wide variety of purposes, including the detection of forest fires, the study of traffic patterns, and the observation of natural disasters. At the present, such surveys are carried out from aircraft, balloons or earth orbiting satellites. This invention provides the means for locating light observing instruments on a platform floating at high altitudes in the atmosphere.

Any direct contact measurement of atmospheric properties at high altitudes is usually carried out by instruments located on aircraft, balloons, rockets, and occasionally on earth orbiting satellites. These same means of transportation are used to lift astonomical telescopes to altitudes above much of the atmosphere, in order to enhance the accuracy of observation. The present invention makes it possible to raise instrumentation to high altitudes by locating them on a platform as described below. Such instruments may be used to perform direct contact atmospheric measurements, as well as astronomical observations.

One method to keep a platform afloat and/or to move it or change its orientation in the atmosphere was described in my prior U.S. Pat. No. 4,253,190 issued on Feb. 24, 1981, entitled "Communications System Using a Mirror Kept in Outer Space by Electromagnetic Radiation Pressure". According to that patent, a communications mirror is kept afloat and can be raised, lowered or be moved horizontally and reoriented through forces exerted by electromagnetic radiation beamed at the mirror from a man-made installation.

The purpose of the present invention is to improve on and to expand the method described in the mentioned patent in several ways, including the following:

1. The platform may be kept afloat and moved by less radiation beamed at it.
2. Conditions may be arranged so that the desired acceleration or floatation occurs as a result of utilizing natural sources of heating, such as radiation from the sun (without any man-made radiation beamed at the platform, and also without any artificial means of heating the platform).
3. Smaller antennas may suffice to direct and receive the radiation when the wavelength is shorter.
4. The platform may serve not only as a passive reflector, but also as an active reflector, an instrument-carrying platform.

With the recent progress in microfabrication techniques, instruments weighing no more than a few grams are capable of performing important tasks, such as transmitting, receiving and processing information. The invention to be described here will make it possible to locate such lightweight instruments at high altitudes, at relatively low cost. By contrast, the methods in general use today require a relatively heavy (and expensive) lifting structure, such as a rocket, airplane or balloon, for lifting any payload whether heavy or light.

It will become clear from the following description of the present invention that this invention utilizes a mechanism which differs from conventional methods of keeping an object aloft, or accelerating it in an atmosphere.

Indeed, satellites and rockets can keep a platform aloft even in the absence of a surrounding atmosphere. By contrast, the present invention utilizes the presence of a surrounding atmosphere; in the absence of an atmosphere the invention to be described can not be used.

On the other hand, airplanes and helicopters stay aloft only as long as they themselves, or a part of them (the propeller) moves with sufficient speed with respect to the surrounding atmosphere. By contrast, the present invention makes it possible to keep an object aloft even if all parts of the object are at rest with respect of the surrounding atmosphere as a whole.

Finally, for a balloon to stay aloft, it is necessary that the hydrostatic pressure at the top and bottom of the balloon be sufficiently different. By contrast, the present invention enables one to keep a platform afloat, even if the hydrostatic pressure at the top and bottom surface of the object is the same.

In the following discussion I will use the phrase "atmospheric-particle-momentum-transfer-characteristics" of a surface of an object to mean those characteristics of a surface which determine the magnitude and direction of the momentum transferred to the object by atmospheric particles impinging on the surface.

This invention provides a method for imparting an atmospheric-particle-momentum-derived net force on an object having at least two surface portions appropriately disposed thereon. The net atmospheric particle momentum transfer characteristics between the two surface portions are different. An object which has these characteristics will be referred to as a "platform".

The platform is placed in the atmosphere, in a region having a generally known distribution of temperature, density and composition with the surface portions exposed. A temperature differential is established between at least one of the surface portions and the atmosphere. As a result, different atmospheric particle momentum transfer occurs on the two surface portions. This results in a net force being applied to the platform.

These and other objects and advantages of the present invention will be more clearly understood from a consideration of the drawings and the following detailed description of the preferred embodiments.

BRIEF DESCRIPTION OF THE DRAWINGS

FIG. 1 is a simplified schematic illustrating the principle of this invention in which a net atmospheric momentum is transferred to an object.

FIG. 2 is an enlarged fragmentary portion of the object of FIG. 1 illustrating one method of practicing this invention by using an appropriately chosen surface structure.

FIG. 3 is a simplified schematic illustrating a method of this invention to suspend an object in the earth's atmosphere.

FIG. 4 is a simplified schematic of one embodiment of a floating object as shown in FIG. 3.

FIG. 5 is a specific embodiment of the object of FIG. 4.

FIG. 6 is an enlarged view of a portion of an object usable as the object shown in FIG. 5.

Figure 9:
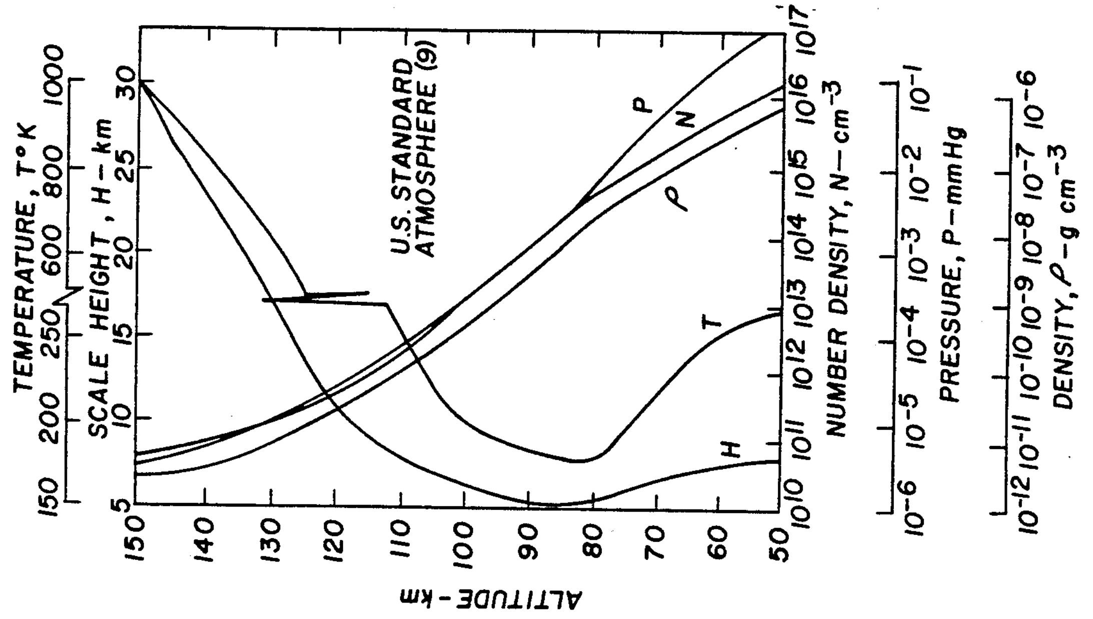
FIG. 9 is a chart showing the parameters of the earth's atmosphere at high altitudes.

The embodiment of the invention, as shown generally in FIG. 3, could be used to reflect communications signals, or to carry instruments. In the following description I will restrict myself to the case when the platform is used as a telecommunications reflector 20.

The reflector will float in the atmosphere of the earth, as a result of a net momentum transfer to the reflector surface by atmospheric particles (molecules). In order that this momentum transfer be non-zero according to the mechanism proposed by the present invention, a temperature difference must be established between at least one portion of the reflector surface and the adjacent atmosphere.

Such a temperature difference may be established either actively or passively. For instance, the reflector surface may be allowed to radiate out energy fast enough to maintain at least one portion of the reflector surface at a sufficiently low temperature; or at least part of the reflector surface may be heated intensely enough to maintain at least part of the reflector surface at a high enough temperature; or both.

One method of heating consists of irradiating the reflector by electromagnetic radiation, as is illustrated schematically in FIG. 3. In that figure the platform or reflector 20 is schematically represented by a rectangular shape, and radiation is incident at the platform from the sun 22 (a natural radiation source) as well as from man-made radiation sources located partly on a vehicle, such as an airplane 24, and on a surface 26 of the earth. The sources, also referred to as establishing means, creating means, means for impinging, temperature changing means, temperature raising means, and beam means, may include an antenna 28 located directly below the floating reflector and an antenna 30 directing radiation non-vertically to reflector 20. This figure illustrates some sources of radiation which may be utilized in this embodiment; not all of them need be used simultaneously, one radiation source, if intense enough, will suffice.

The floating telecommunications reflector may have the shape of a dish 32 facing down as shown in FIG. 4. A bob 34 made of a suitable material such as copper, aluminum or carbon is suspended from the rim of the reflector by chords, such as chord 36, made of aluminum, carbon fiber or other suitable material, reminiscent of the manner in which a parachutist is suspended from a parachute. When irradiated from below by an electromagnetic radiation beam, in which the radiated flux density decreases monotonically in every horizontal direction with increasing distance from the beam axis, a reflector so constructed can be made stable against unwanted horizontal displacements and against tilting.

Figure 8:
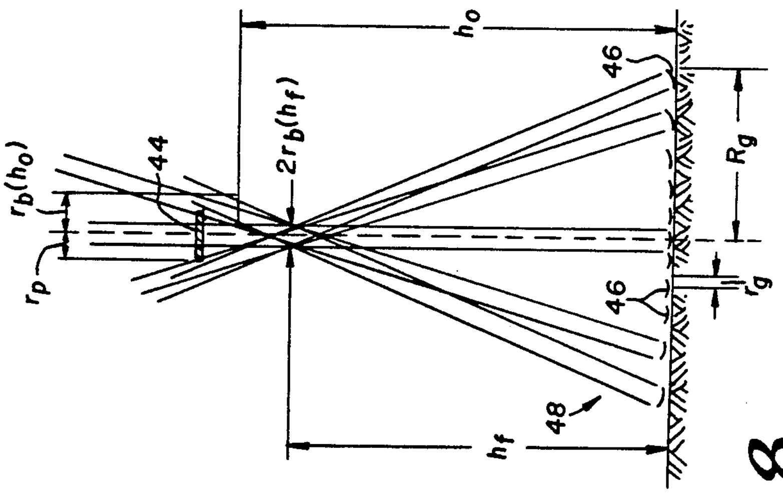
FIG. 8 is also a simplified schematic illustrating another embodiment of a radiation beam usable in supporting the object illustrated in FIG. 4.
Figure 7:
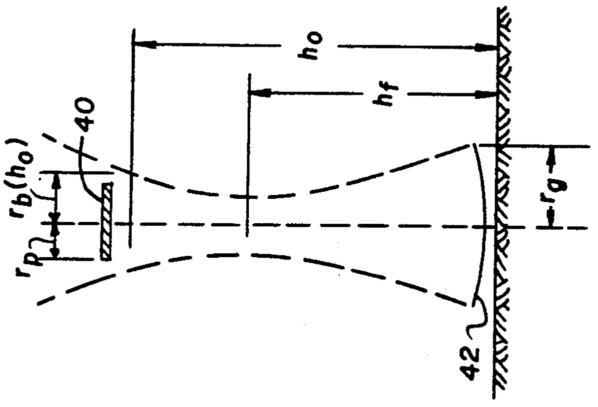
FIG. 7 is a simplified schematic illustrating an embodiment of a radiation beam usable in supporting the object illustrated in FIG. 4.
Figure 10:
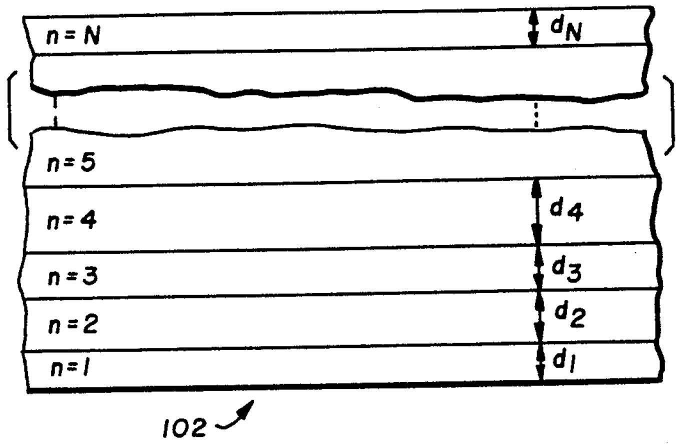
FIG. 10 is a simplified generalized schematic of a side view of an enlarged portion of an embodiment constructed with a plurality of layers usable in the object of FIG. 3.
Figure 11:
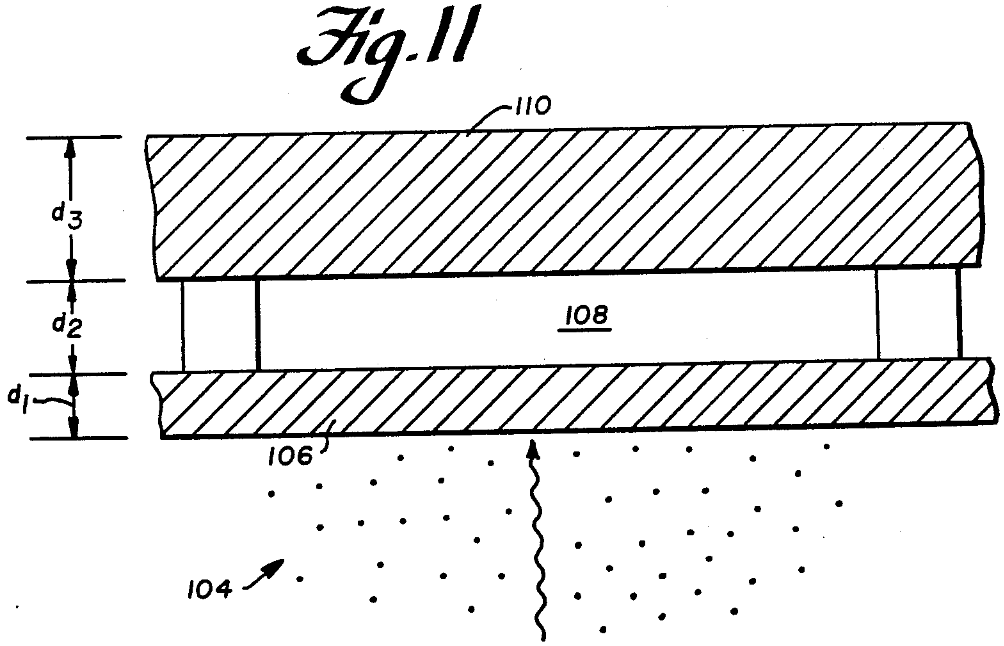
FIG. 11 is an enlarged side view of a specific embodiment of FIG. 10.

Vertical reflector stability can be insured by bringing the electromagnetic beam to a focus below the reflector dish, as illustrated in FIGS. 7 and 8. When the parameters of the atmosphere (notably density and temperature) depend on altitude appropriately, then additional vertical stability will be produced by the atmosphere itself.

FIG. 7 shows a reflector dish 40 suspended in the earth's atmosphere generally at an altitude $h_o$. A single ground antenna 42 of radius $r_g$ focuses the radiation at an altitude $h_f < h_o$. Dish 40 has a radius $r_p$ which is less than the radius of the beam $r_b(h_o)$ at altitude $h_o$.

FIG. 8 shows a reflector dish 44 suspended generally at an altitude $h_o$ in a radiation beam projected upward by an array, shown generally at 48, of ground emitters, such as emitter 46. Each emitter 46 has a radius $r_g$. The radius of the array formed by emitters 46 on the ground is $R_g$. The composite radiation beam formed of the individual beams emitted by each emitter 46 is focused at an altitude $h_f < h_o$. Dish 44 has a radius $r_p$ which is less than the radius of the composite beam $r_b(h_o)$ at altitude $h_o$.

For launching, the floating platform may be placed on a frame or in a container, while being lifted through the lower layers of the atmosphere. It may be lifted by a rocket, or, as described in my prior U.S. Pat. No. 4,253,190, by a balloon or a series of balloons. Alternatively, it may be deployed from an orbiting space installation, such as a space shuttle or a space laboratory.

A reflector dish or body can be made of a solid continuous surface, such as dish 32 shown in FIG. 4, or of a surface with openings in it or of a wire mesh, such as a dish 38 shown in FIG. 5. The individual wires 39 in the wire mesh may have various cross sections, in particular, they may be ribbonshaped. Each ribbon itself can be constructed from a number of layers. The details of a more sophisticated layered structure can be observed in FIG. 6, in which case neighboring material layers $C_{mb}$, $C_{m1}$, $C_{m2}$ and $C_{mt}$ are connected to each other by bridges made of thermal insulating material such as $C_{mm1}$, $C_{mm2}$ and $C_{mm3}$, so as to ensure that the surface of each layer can be kept at different appropriate temperatures. In special cases the thickness of one or more of the bridges may be reduced to zero to produce structures having a variety of layering configurations.

The net atmospheric momentum transferred to a floating reflector depends not only on the temperature of the reflector surfaces and the atmosphere, but also on other parameters. In particular, these parameters include the atmospheric density, and the surface structure (e.g., smooth or corrugated) as well as material composition, including thin covering layers which may be deposited on the surface material. In Table I the value of all these parameters are listed for a variety of floating reflector constructions. That table also lists the dimensions of the reflector dish; details of its construction including parameters of the layered structure; the important heat transfer properties; the wavelength and power of the electromagnetic radiation incident on the reflector; the lift force produced by the net atmospheric momentum transfer to the surface of each of the reflectors under discussion, as wwell as some other parameters.

DESCRIPTION OF THE PRINCIPLE OF THE INVENTION

The basic principle on which the method is based, is illustrated in FIG. 1. It shows a horizontal flat plate 90, on which molecules are impinging from the surrounding atmosphere. After collision with the plate, the molecules recoil, as shown in the figure. (The recoil may be delayed).

Although the figure shows a flat plate which is horizontal, the principle to be described works for other shapes and orientations as well. This is, because if the object is to be kept afloat, or accelerated vertically, without the need to exert any horizontal forces, then—as will be seen later—only the vertical momentum components are of interest. On the other hand, if a horizontal force is to be exerted on the platform, those can be discussed in the same manner in which the vertical momentum components will be discussed presently. In general, of course, both horizontal and vertical forces can be simultaneously exerted on the platform by the method to be described.

A molecule impinging on the surface from above (molecule 1) has incident momentum $\bar{P}_1$ at an angle $\theta$, to normal axis 92. (See FIG. 1.) The perpendicular (to the surface) component of $P_1$ is $P_{1\perp}=-P_1 \cos \theta_1$. In this geometry $P_{1\perp}$ is also the vertical component of $\bar{P}_1$. After collision with the surface the molecule rebounds at an angle $\theta_1'$ with momentum $\bar{P}'$, and its perpendicular (also vertical) component is $P_1'{}_\perp=P_1' \cos \theta_1'$. The $\bar{P}_2$, $P_{2\perp}$, $\bar{P}_2'$, $\bar{P}_2'{}_\perp$, $\theta_2$ and $\theta'_2$ are the corresponding quantities referring to a particle impinging on the plate from below (molecule 2).

The perpendicular momentum transferred to the plate during a collision with molecule i with the plate is $$\Delta P_{i\perp}=P_{i\perp}-P_1{}'_\perp;\ i=1, 2 \quad (1)$$

If the collision is elastic, then $P_i'{}_\perp=-P_{i\perp}$, and $$\Delta P_{i\perp}=2P_{i\perp};\ i=1, 2 \quad (2)$$

If the collision is inelastic, then $|P_i'{}_{195}|$ may be larger or smaller than $|P_{i\perp}|$.

If the plate is at rest and in thermal equilibrium with the surrounding atmosphere, then the average (over all impinging molecules) of $|P_{i\perp}|$ equals the average of $|P_i'{}_\perp|$, and the temperature of the plate will, on the average, not change as a result of collisions with the molecules of the surrounding atmosphere. In general, however, this is not the case. In particular, if the temperatures of the plate surfaces differ from that of the surrounding atmosphere, then, even if the plate is at rest with respect to the atmosphere, net heat energy can be transferred to or from the plate by collisions with molecules in the surrounding atmosphere. Furthermore, the average of $\Delta P_{1\perp}$ (averaged over all molecules impinging from above), may differ from the average of $-\Delta P_{2\perp}$ (averaged over all molecules impinging from below). In that case the plate will experience a net vertical force as a result of collisions with molecules of the surrounding atmosphere.

To derive a formula for the force acting on a plate immersed in an atmosphere, the notation to be used will be specified next.

Denote the number density of the atmosphere next to the surface by $\rho$ and the average molecular mass of the atmospheric particles by M. The velocity of an atmospheric particle before collision with the surface will be denoted by $\bar{v}$ and the component of $\bar{v}$ perpendicular to the surface will be written as $v_\perp$. The same quantities after collision will be denoted by $\bar{v}'$, and $v_\perp'$ respectively. The same two quantities referring to particles of the surface under consideration before the collision to be studied takes place, will be written as $\bar{v}_s$ and $v_{s\perp}$ respectively. The kinetic energy of an atmospheric particle before collision is K. The pressure of the atmosphere before collision with the surface is denoted by $P_g$.

A quantity in pointed brackets < > represents an average value of that quantity, averaged over particles in the atmosphere. A quantity under a wiggle means that the quantity is averaged over molecules incident on the surface, e.g. $|\tilde{v}_\perp|$ is the so averaged value of $|v_\perp|$.

A subscript t (or b) next to a quantity means that the quantity is to be evaluated on the top (or bottom) surface, or for the atmosphere adjacent the top (or bottom) surface. A t (or b) subscript next to a parenthesis means that all quantities inside that parenthesis refer to the top (or bottom) surface, or to the atmosphere adjacent that surface.

The area of the top and bottom surface of a plate is assumed to be the same, and either surface area will be denoted by A.

The total normal force exerted on a horizontal plate by collisions with atmospheric particles is $F_\perp$. If it points upwards, then it will be considered positive.

The $\bar{v}'_t$ and $\bar{v}'_b$ depend not only on $\bar{v}$, but also on the chemical composition of the atmosphere and the surfaces, the structure (shape, crystal structure, roughness) of the surface, and the temperature of the atmosphere and that of the surfaces.

One frequently uses "accommodation coefficients", $\alpha$, to characterize $\bar{v}'$. The temperature accommodation factor is defined as $$\alpha_T = \frac{T - T}{T - T_s},\ ;\ (T \neq T_s), \quad (5)$$

where T and T′ are the temperatures of the gas molecules (or atoms) before and after collision with the surface, respectively, and $T_s$ is the temperature of the surface. When $T'=T_s$, then $\alpha_T=1$, and one can say that the temperature of the colliding molecule is completely accommodated; when $T'=T$, then $\alpha_T=0$, and one can say that there is no temperature accommodation. Similarly, one can define the accommodation coefficient for normal velocity components as $$\alpha_\perp = \frac{(|\tilde{v}_\perp|)^2 - (|\tilde{v}_\perp'|)^2}{(|\tilde{v}_\perp|)^2 - (|\tilde{v}_{\perp s}|)^2 \frac{M_s}{M}}, \left[ (|\tilde{v}_\perp|)^2 \neq (|\tilde{v}_{s\perp}'|)^2 \frac{M_s}{M} \right], \tag{6}$$

were $M_s$ is the effective mass of the particles forming the surface. Again, $\alpha_\perp=1$ and 0 means complete accommodation and no accommodation, respectively.

The total normal force exerted on a horizontal plate by collisions with atmospheric particles is $F_\perp$. If it points upwards, then it will be considered positive.

The total pressure exerted on a horizontal plane by collisions with atmospheric particles is $P_\perp=F_\perp/A$.

$$P_\perp = \left\{ \left[ \rho\langle K\rangle \frac{\langle v_\perp^2\rangle}{\langle v^2\rangle} h_1 h \left( 1 + \sqrt{(1-\alpha_\perp) + \alpha_\perp \frac{h_s^2}{h^2} \frac{M_s\langle v_{s\perp}^2\rangle}{M\langle v_\perp^2\rangle}} \right) \right]_b - \left[ \rho\langle K\rangle \frac{\langle v_\perp^2\rangle}{\langle v^2\rangle} h_1 h \left( 1 + \sqrt{(1-\alpha_\perp) + \alpha_\perp \frac{h_s^2}{h^2} \frac{M_s\langle v_{s\perp}^2\rangle}{M\langle v_\perp^2\rangle}} \right) \right]_t \right\}, \tag{7}$$

When the velocity distribution of the surrounding atmosphere is Maxwellian, corresponding to a temperature T, and the velocity distribution of the molecules on the surface of Maxwellian, corresponding to a temperature $T_s$, then $$P_\perp = \left\{ \left[ \rho\frac{kT}{2} \right]_b - \left[ \rho\frac{kT}{2} \right]_t + \left[ \rho\frac{kT}{2} \sqrt{(1-\alpha_\perp) + \alpha_\perp\frac{T_s}{T}} \right]_b - \left[ \rho\frac{kT}{2} \sqrt{(1-\alpha_\perp) + \alpha_\perp\frac{T_s}{T}} \right]_t \right\}, \tag{8a}$$

where k is the Boltzman constant: $1.380\cdot10^{-16}$ ergs/°K.

When the atmosphere is Maxwellian around the platform, and the temperature of the atmosphere has the same value, T, near the top and bottom surface, while the density of the atmosphere, ρ; has the same common value near both surfaces, then Eq. (8a) reduces to $$P_\perp = \rho\frac{kT}{2}\left\{ \left[ \sqrt{(1-\alpha_\perp) + \alpha_\perp\frac{T_s}{T}} \right]_b - \left[ \sqrt{(1-\alpha_\perp) + \alpha_\perp\frac{T_s}{T}} \right]_t \right\} = f_\perp G_\perp. \tag{8b}$$

Here $f_\perp=\rho(kT/2)$, and $G_\perp$ is defined by the last link in Eq. (8b).

The invention to be described herein produces a lift force by regulating the following surface properties:

I. The temperature of the top and bottom surface of the plate,

II. The $\alpha_\perp$ on the top and bottom surface of the plate,

III. The atmospheric temperature adjacent the top and bottom surface of the plate.

I. The Control of $\alpha_\perp$.

1. Increased surface structuring

Assume that $\alpha_\perp<1$ on a flat surface. The effective $\alpha_\perp$ can be increased by arranging things so that a molecule impinging on the surface will on the average make more collisions before leaving the surface.

This is illustrated in FIG. 2. The top surface **96*a* of a platform 96 is flat, while the bottom surface 96*b* is appropriately structured with slits or indentations, such as indentation 96*c***. The shape of the indentations on the bottom surface was chosen to be rectangular in the figure with a width $a_w$ and height $a_h$, but that is not necessary. Also, the dimensions $a_w$ and $a_h$ need not be the same for each indentation. It can be seen that in general a deeper structure, i.e., larger $a_h$, means more collisions of the impinging molecule before it finally returns to the surrounding atmosphere, thus it means larger effective $\alpha_\perp$.

It can further be seen that more indentations per unit surface also tend to produce higher $\alpha_\perp$.

For any particular chosen surface structure shape, the increase in effective α can be obtained by ray tracing, as illustrated by incident particle travel paths or rays 98, 100.

It should be noted, that in FIG. 2 it is assumed that an incident molecule collides only with the surface structure, and not with other atmospheric molecules, before it returns to the atmosphere. In other words, it is assumed that for sufficiently many molecules the mean free path $l_m$, of the molecule in the atmosphere is not much less than the total path length, $l_s$, traveled by the molecule between the times when it arrives at the surface and when it finally leaves the surface:

$$l_s \lesssim 3l_m \tag{12}$$

In the following discussion inequality (12) will be assumed.

To obtain the final result, one has to average over all incident molecular velocities. In certain special cases the result can be obtained analytically. Such is the case for rectangular structures, when collisions between gas molecules can be neglected and when the collisions with the surface are specular, i.e., when the plane of incidence coincides with the plane of reflection, and the angle of incidence, $\theta_i$, equals the angle of reflection $\theta_r$. Both $\theta_i$ and $\theta_r$ are measured from the surface normal, ñ.

In this case one finds that the average number of scatterings for a particle with given $\theta_i$ is $$N(\theta_i)=1+2(a_b/a_w)\tan\theta_i, \qquad (13a)$$

when the plane of incidence is the (x,z) plane as viewed in FIG. 2. When it is not, then $$N(\theta_{ix},\theta_{iy}) = 1 + 2a_h\left[\frac{1}{a_w}(\tan\theta_{ix}) + \frac{1}{a_l}(\tan\theta_{iy})\right], \qquad (13)$$

where $a_l$ is the length of the grooves oriented along the y axis. Here $\theta_{ix}$ and $\theta_{iy}$ is the angle subtended by the z axis and the projection of the incident molecular velocity onto the (x,z) plane and (y,z) plane, respectively.

It should be recalled that the above discussion is valid only when the atmospheric particle makes no collision with other atmospheric particles while it travels the distance $l_s$. When such collisions do take place than, to obtain N, one should trace a molecule's path from the time of its incidence until $l_m \approx l_s$, and N should then be taken as the number of collisions the molecule makes with the surface structure before $l_s$ reaches a value close to or somewhat larger than $l_m$. If the smallest typical dimension of the surface structure is larger than 2 or 3 times $l_m$ then this particular method of controlling $\alpha_\perp$ becomes ineffective. Then other methods have to be used, as described below.

Note that with today's technology surface structures of typical dimensions of $\gtrsim$300 Å can be manufactured, and random structures of even smaller dimensions can be produced.

2. Appropriate Choice of Surface Materials

One can insure that $(\alpha_\perp)_b$ differs from $(\alpha_\perp)_t$, by preparing the top and bottom surfaces from appropriately chosen materials.

A number of very accurate measurements of $\alpha$ on various metals have been performed (1)(2). The results demonstrate that values of $\alpha$ can differ significantly, certainly up to a factor of 5, from one metal to another, even when the atmosphere and its temperature, as well as the surface temperatures are the same for both cases.

When a thin atomic or molecular layer covers an appreciable fraction of a substratum surface, the surface properties can differ significantly from those of the uncovered surface, and also from those of the covering material in bulk. "Thin" here means either monolayer coverage, or a coverage of at most a few atoms or molecules thick. Following general usage, the fraction of surface covered by a thin layer will be denoted by $\theta$.

It is usually the case that if a flat surface is covered appreciably by a thin layer, the effective $(\alpha_\perp)_{eff}$ increases. This fact can be used to increase $F_\perp$ [See Eq. (8)].

The change in $(\alpha_\perp)_{eff}$ induced by thin surface layers is mostly the result of two effects: first, the direct inelastic scattering (5) of atmospheric molecules off a clean surface differs from that of a covered surface. Second, the probability of trapping of atmospheric molecules on clean and covered surfaces is not the same.

So far the discussion was focused on a surface force, F, generated by atmospheric molecules colliding with a plane horizontal surface. The normal component of this force, $F_\perp$, points in the vertical direction.

The same discussion can be applied to surfaces which are non-planar. In that case, each infinitesimally small section of the curved surface has to be considered separately. Each such infinitesimal section can be considered to be planar. The normal force component at each of these sections can then be evaluated, and controlled by the methods discussed earlier. The normal force component will, of course, no longer be necessarily vertical. In general, it can be decomposed into vertical and horizontal components, $F_v$ and $F_h$, and in this manner the effect of surface forces on general surfaces can be taken into account.

II. Increased Radiation Absorption in Thin Layers

When electromagnetic radiation is incident on a surface, usually part of the radiation is reflected. When the surface is a shiny metal surface and the radiation is either visible light or has wavelength longer than that of visible light, then usually most of the radiation is reflected, and does not penetrate beyond the surface. This is undesirable if one wishes to use electromagnetic radiation for heating a medium. Therefore, for that purpose, it is advantageous to find ways to reduce the amount of radiation reflected from the surface of the medium to be heated. One way to achieve this consists of inserting a "quarter wave coating" in front of the surface in question. The "quarter wave coating" is a layer of transparent medium, whose thickness is about one quarter of the wavelength of the radiation inside that medium. Such coatings are frequently used on optical elements. A feature of this method is, of course, that the original surface has to be coated and can not come in direct contact with the surrounding atmosphere. That is unacceptable when the original surface has to be exposed directly to the surrounding atmosphere. In the latter case, another method can be used, as described below.

(A) Suppose that the incident electromagnetic radiation contains radiation with wavelength $\lambda_o$; in addition, it may also contain waves with other wavelengths. The surface of the object is covered by a layer of the material to be exposed to the surrounding gas. Beyond this, other layers are constructed, altogether N in number. Referring specifically to FIG. 17, a multilayer object 102 is shown fragmentarily. The surface layer is the first layer, denoted by n=1, the other layers are denoted by n=2, . . . ,N. The thickness of the $n^{th}$ layer is denoted by $d_n$. The method consists of choosing the thickness of at least one layer say $d_j$ so that radiation with vacuum-wavelength $\lambda_o$ will resonate or almost resonate inside that layer. In other words, $d_j$ is chosen so that the oscillation phase of the radiation entering the $j^{th}$ layer at the interface between the $(j-1)^{st}$ and $j^{th}$ layers, is the same, or nearly the same, as the oscillation phase of that same radiation after being reflected once by the interface between the $j^{th}$ and $(j+1)^{st}$ layers, and subsequently also reflected by the interface between the $(j-1)^{st}$ and $j^{th}$ layers. For such $d_j$, the amplitude of electromagnetic oscillation will build up inside the $j^{th}$ layer, and with it absorption of radiation at the boundaries of the $j^{th}$ layer will increase each time the wave is reflected there. Since the absorbed wave can not be reflected, this increased internal absorption inside the layered structure will decrease the radiation reflected from the surface of the object, which was precisely the purpose to be accomplished.

The required $d_j$ value can be calculated as follows. Denote the complex amplitude reflectance of the interface between the $(j-1)^{st}$ and $(j)^{th}$ layer by $r_a(j-1,j)$, and that for the interface between the $(j)^{th}$ and $(j+1)^{st}$ layer by $r_a(j, j+1)$. Write $$r_a(j-1,j)=|r_a(j-1,j)|\exp[i\phi_r(j-1,j)],$$

$$r_a(j,j+1)=|r_a(j,j+1)|\exp[i\phi_r(j,j+1)],$$

where $\phi_r(j-1,j)$, and $\phi_r(j,j+1)$ are the corresponding complex phases. Denote the real part of the inverse wavelength of the radiation in question inside the $j^{th}$ layer by $[(1/n)\lambda_o]^{-1}$. Then the change in oscillation phase of the wave, while it travels across the $j^{th}$ layer, and back again, in a direction making an angle $\theta_j$ with the normal to the layer boundaries, will be $$\Delta\phi=4\pi n d_j/\lambda_o \cos\theta_j$$

Therefore, to achieve resonance, $d_j$ has to satisfy $$d_j=[-\phi_r(j-1,j)-\phi_r(j,j+1)+2\pi(\text{int.})]\frac{\lambda_o\cos\theta j}{4\pi n},$$

where (int.) means any integer number. When resonance is not achieved, only approached, then $d_j$ is near the value given above.

Note that the $j^{th}$ layer may itself have a layered structure, i.e., it may comprise a number, say $N_j$, of sublayers. If so, then the above discussion still holds, provided that one understands, $(1/n)\lambda_o$ to mean the effective average wavelength inside the $j^{th}$ layer of the radiation in question. Then $\Delta\phi$ is still given as stated above. In such a case one can define $\tilde{n}=n+ik$, with $\tilde{n}$ being the average effective complex index of rafraction within the $j^{th}$ layer for the electromagnetic radiation with vacuum wavelength $\lambda_o$, and n and k being its real and imaginary part, respectively. In the special case when the $j^{th}$ layer contains only one sublayer: itself, then $N_j=1$, and the effective average $\tilde{n}$ equals the value of the local $\tilde{n}$ everywhere inside the $j^{th}$ layer.

Note also that everything said so far is true even if the $j^{th}$ layer consists of a vacuum, provided that the $(j-1)^{st}$ and $(j+1)^{st}$ layers do not consist of a vacuum. If the $j^{th}$ layer is not a layer of vacuum, then increased absorption of the wave inside the layer itself will also be present, and will further decrease reflection from the surface of the object.

(B) It is sometimes desirable to ensure that radiation incident on a layered structure will be absorbed predominantly in one or more preselected layers, as opposed to the rest of the layers. The preselected layer(s) may be located at or near the surface of the layered structure. Alternatively, the preselected layer(s) may be located deeper inside the structure.

To achieve such absorption, one has to ensure, first of all, that as much as possible of the incident radiation is absorbed by the structure, as opposed to being reflected off its surface. A method to achieve this was described above under A. In addition, one also has to ensure that the absorbed energy density inside the volume is highest in the selected layers (as opposed to other layers). That can be achieved by the method described in the following.

The method consists of constructing the layered structure as follows:

1. Make at least one layer thickness, say $d_j$, so that the incident radiation of vacuum wavelength $\lambda_o$, will be at or near resonance as it crosses this layer along a direction which makes an angle $\theta$ with the surface normal. Again, the layer in question may itself comprise a number of sublayers.

2. Locate all preselected layers next to, or near at least one of the resonant layers. "Near" in this context means a location where the preselected layer will benefit from the enhanced electromagnetic radiation inside a resonant layer. Clearly any number of unselected layers may be interposed a resonant layer and a corresponding selected layer, provided only that the interposed layers are transparent enough.

3. Subject to other requirements including those imposed by present technology, choose the thickness, $d_s$, of any selected layer to be close to, or at least to be of the order of magnitude of (i.e., to be within a factor of at most about 10 of) $[4\pi m_s k_s/\lambda_o \cos\theta_s]^{-1}$, where $m_s$ is the average number of times the radiation inside the layer will be scattered back-and-forth before eventually leaving the layer, $k_s$ is the effective average imaginary part of the index of refraction inside the layer, and $\theta_s$ is the angle defined in part (A).

Platform Stability

A platform afloat in an atmosphere can be kept stable against tilting, as well as against vertical and horizontal displacements, provided it has an adequate number of plates attached to it. For example, three horizontal plates located at the tips of an equilateral-triangle-shaped platform may be used to stabilize the platform against tilting or to impart a net vertical momentum to the platform. Two vertical plates may be used to rotate the platform around a vertical axis or to impart horizontal net momentum to the platform.

The terms "vertical" and "horizontal", as used by me in connection with platform stability, are defined below under Horizontal Stability.

Vertical Stability

The platform can be maintained near a desired altitude, $h_o$, in several ways. For example, if it is noticed that for some reason the platform starts rising above $h_o$, the lift force can be reduced. Similarly, an undesired descent can be counteracted by increasing the lift force. Two other methods are described below. They require neither continuous monitoring of platform altitude, nor feedback, provided that $h-h_o$, the unwanted vertical platform displacements away from $h_o$, are sufficiently small in absolute value.

1. Denote by $F_{pv}$ the lift force induced by the method described in this invention, while $F_{gv}$ and $F_{cv}$ denote the vertical components of the gravitational force and other inertial forces (e.g., the one induced by earth rotation), respectively. Let $G_v=F_{gv}+F_{cv}$, and $F_{sv}=F_{pv}+G_v$. Expand in power series in $(h-h_o)$ near $h_o$:

$$F_{pv}=F_{pv}(h_o)[1-\kappa_1(h-h_o)-\ldots]$$

$$G_v=G_v(h_o)[1-\kappa_2(h-h_o)+\ldots]$$

If $F_{pv}(h_o)=-G_v(h_o)$ is chosen, then, at $h=h_o$, the net vertical force exerted on the platform by the lift force, gravitation and inertial forces, will be zero. At altitudes other than $h_o$, but still near $h_o$ $$F_{sv}(h)=-F_{pv}(h_o)(\kappa_1-\kappa_2)(h-h_o)+\ldots$$

The $\kappa_1$ and $\kappa_2$ coefficients can be calculated as follows:

$$\kappa_1 = [A_b(h_o)]^{-1}\left(\frac{dA_b}{dh}\right)\Bigg|_{h=h_o}[F_{pv}(h_o)]^{-1}\left(\frac{dF_{pv}(h_o)}{df_r}\right)f_r,$$

$$\kappa_2 = \frac{-2g(h_o) + \omega_E^2(R_E + h_o)\cos^2\theta}{g(h_o) + \omega_E^2(R_E + h_o)\cos^2\theta} \cdot \frac{h - h_o}{R_E + h_o} \cdot \frac{1}{h - h_o}.$$

Here $A_b(h)$ is the effective cross section at altitude h, of the radiation beam which induces the lift force acting on the platform, $R_E$ is the radius of the earth, $\omega_E$ is the angular frequency of earth rotation, and $\theta$ is the geographic latitude of the platform. The $f_r$ is the average flux density of the radiation beam incident on the platform. It is assumed that the radiation beam completely envelops the platform.

The effective vertical restoring potential can be written as $$V_s(h) = \tfrac{1}{2}F_{pv}(h_o)(\kappa_1 - \kappa_2)\cdot(h - h_o)^2 + \ldots$$

When $\kappa_2$ is negligible compared to $\kappa_1$, this expression reduces to $$V_s(h) = \tfrac{1}{2}F_{pv}(h_o)[A_b(h_o)]^{-1}\left(\frac{dA_b(h_o)}{dh}\right)f_r[F_{pv}(h_o)]^{-1}\cdot \left(\frac{dF_{pv}(h_o)}{df_r}\right)(h - h_o)^2 + \ldots$$

The platform will be stable near $h_o$, whenever $V_s$ has a minimum near $h_o$. For positive $(dF_{pv}(h_o)/df_r)$ that happens if $dA_b(h_o)/dh > 0$, i.e., if the radiation beam is brought to a focus below the platform located at altitude $h_o$. That in turn can be achieved in several ways, two of which are illustrated in FIGS. 7 and 8. Similarly, when $(dF_{pv}(h_o)/df_r) < 0$, then stability will be induced if the radiation is brought to a focus above the platform altitude.

It will be recalled that FIGS. 7 and 8 illustrate radiation beams projected upward by a single ground antenna 42 and an array 48 of ground emitters 46, respectively. At altitude h the radiation beam has effective cross section $A_b(h)$; this corresponds for a circular beam to an effective radius $r_b(h) = (A_b(h)/\pi)^{1/2}$. At the beam focus the effective beam cross section is $A_b(h_f)$, and the corresponding effective beam radius is $r_b(h_f)$. Each figure shows an arrangement by which the radiation beam is focused at an altitude $h_f < h_o$. As discussed above, this ensures vertical stability of the platform near $h_o$, whenever $\kappa_2 << \kappa_1$ and $dF_{pv}(h_o)/df_r > 0$.

2. The method just described ensures vertical platform stability by making use of a focused beam of radiation impinging on the platform, i.e., a beam for which $(dA_b(h_o)/dh) \neq 0$. However, even if the beam cross section does not change with altitude when h is near $h_o$, i.e. even when $(dA_b(h_o)/dh) = 0$, the vertical stability of a floating platform may be ensured without continuous altitude monitoring or feedback, if the properties of the surrounding atmosphere near altitude $h_o$ are appropriate. One needs to know the surrounding atmospheric temperature T, and density $\rho$, near the altitude $h_o$.

When $\kappa_2$ is negligible compared to $\kappa_1$, then vertical platform stability requires $$\kappa_1 = -[F_{pv}(h_o)]^{-1}\left(\frac{dF_{pv}(h_o)}{dh}\right) =$$

$$-[F_{pv}(h_o)]^{-1}\Bigg\{\frac{\partial F_{pv}}{\partial \rho}\frac{d\rho}{dh} + \frac{\partial F_{pv}}{\partial T}\frac{dT}{dh} + \frac{\partial F_{pv}}{\partial T_{sb}}\frac{dT_{sh}}{dh} + \frac{\partial F_{pv}}{\partial T_{st}}\frac{dT_{st}}{dh} + \frac{\partial F_{pv}}{\partial \alpha_{\perp b}}\left(\frac{\partial \alpha_{\perp b}}{\partial \rho}\frac{d\rho}{dh} + \frac{\partial \alpha_{\perp b}}{\partial T}\frac{dT}{dh} + \frac{\partial \alpha_{\perp b}}{\partial T_{sb}}\frac{dT_{sb}}{dh}\right) + \frac{\partial F_{pv}}{\partial \alpha_{\perp t}}\left(\frac{\partial \alpha_{\perp t}}{\partial \rho}\frac{d\rho}{dh} + \frac{\partial \alpha_{\perp t}}{\partial T}\frac{dT}{dh} + \frac{\partial \alpha_{\perp t}}{\partial T_{st}}\frac{dT_{st}}{dh}\right)\Bigg\} > 0.$$

Consider the last two terms in this equation. The $\partial\alpha_{\perp b}/\partial\rho$ is essentially zero for densities of interest to us, while $\partial\alpha_{\perp b}/\alpha T$ is small except under special circumstances. Similarly, $\partial\alpha_{\perp t}/\partial\rho$ and $\partial\alpha_{\perp t}/\partial T$ can usually be neglected. Furthermore, it often happens that the third and forth terms in the curly brackets in the above expression are small in absolute value compared to the first two terms. Then the first two terms will determine whether atmospheric properties alone may ensure vertical platform stability. (The $\partial\alpha_{\perp}/\partial T_s$ type terms are usually small)

Focused-beam induced vertical platform stability in the presence of vertical platform stability induced by the properties of the surrounding gas, will, of course, result in even stronger stabilizing forces than the latter effect alone would produce.

Horizontal Stability

An appropriately shaped radiation beam incident on a floating platform can cause the platform to be located over a point C on the ground, in an equilibrium which is stable against horizontal displacements.

The primary horizontal forces acting on the platform are the horizontal component of the resultant inertial force, $G_h$ and the horizontal component of the net molecular momentum transfer pressure force, $F_{ph}$, which is generated as described in this invention. Less predictable horizontal forces may also act on the mirror. To ensure that the latter forces do not cause unbounded horizontal platform drift, one has to match the structure of the platform to the radiation distribution within the beam so that the platform will be stable against small horizontal displacements from its desired position.

Let the axis of the radiation beam pass through a chosen point of the platform, $C_p$, when the platform is located at its equilibrium position. The beam is traveling along its axis in a direction which is opposite to the direction of $\overline{G}$, where $\overline{G}$ is the sum of the gravitational force and other inertial forces (such as the one induced by earth rotation). The direction parallel to $\overline{G}$, will be referred to as the "vertical" direction at $C_p$. Any direction perpendicular to the vertical will be referred to as "horizontal". The beam axis intercepts the ground at point C, therefore, C lies "directly below" $C_p$. The "altitude" of $C_p$ is thus the distance between C and $C_p$. The power flux density in the beam at point $\overline{r}_o$ is $f_r(\overline{r}_o)$, where $\overline{r}_o$ is measured horizontally from the beam axis. A point on the surface of the platform has horizontal components $\bar{r}_p$, measured from $C_p$. When $C_p$ is located at its desired position at the beam axis, $\bar{r}_p=\bar{r}_o$, but not otherwise. The net molecular momentum transfer pressure generated by the method described in this invention is $\bar{P}_\perp$, a pressure which is perpendicular to the platform surface whenever the platform is at rest relative to the surrounding gas, or moves slowly with respect to it. Here "slowly" means a platform speed which is small compared to the average effective molecular speed in the surrounding gas. In the following part of this section it will be assumed that the platform either is at rest or moves slowly with respect to the surrounding gas. The $\bar{P}_\perp$ at $\bar{r}_p$ will in general depend on $f_r(\bar{r}_p)$. Its horizontal component will be denoted by $\bar{P}_{\perp h}(\bar{r}_p)$.

The total horizontal molecular pressure force on a platform can be written as $$\bar{F}_{ph}=\int_\sigma \bar{P}_{\perp h}[f_r(\bar{r}_o(\bar{r}_p))]d\bar{r}_p,$$

where $\sigma$ represents all the platform surfaces on which molecular pressure forces act. The integral has to be carried out over each of them. The $f_r$ is to be evaluated at the point $\bar{r}_p$, whose horizontal position measured from the beam axis is $\bar{r}_o$. Hence $\bar{r}_o$ depends on $\bar{r}_p$ as indicated under the integral. The function $\bar{r}_o(\bar{r}_p)$ depends on the position of $C_p$ with respect to its desired location. Assuming that $C_p$ is horizontally displaced from its desired location, and denoting that displacement by $r_{co}$, it is clear that $\bar{r}_o(\bar{r}_p)$ is $$\bar{r}_o=\bar{r}_{co}+\bar{r}_p.$$

Expanding $\bar{F}_{ph}$ in power series in $\bar{r}_{co}$ $$\bar{F}_{ph}/(\bar{r}_{co})=\bar{F}_{ph}(0)+\gamma\bar{r}_{co}+\ldots$$

where $\gamma$ is defined by the above expansion.

Whenever the platform is in equilibrium at its desired position, the first term in this series must vanish. To evaluate the second term, denote by x and y two cartesian coordinate axes in the horizontal plane, and let $x_{co}$ and $y_{co}$ be the corresponding two coordinates of $\bar{r}_{co}$. Then $\bar{F}_{phx}$,$\bar{F}_{phy}$ are the x,y components of $\bar{F}_{ph}$, $$\bar{F}_{ph}(\bar{r}_{co})=\left(\frac{\partial\bar{F}_{phx}}{\partial x_{co}}\right)x_{co}+\left(\frac{\partial\bar{F}_{phy}}{\partial y_{co}}\right)y_{co}+\ldots=$$

$$-\gamma_x\bar{x}_{co}+\gamma_y\bar{y}_{co}(-1)+\ldots,$$

when the x and y axes are oriented appropriately, and where $\gamma_x$ and $\gamma_y$ are defined by the above equation. One can further define the effective horizontal restoring potential:

$$V_H(\bar{r}_{co})=+\tfrac{1}{2}\gamma_x x_{co}^2+\tfrac{1}{2}\gamma_y y_{co}^2+\ldots,$$

and conclude that the platform will be stable against horizontal displacements, provided that both $\gamma_x$ and $\gamma_y$ are positive, i.e., whenever $$0<\gamma_x=\int_\sigma\frac{-d\bar{P}_{\perp hx}}{df_r}\ \frac{\partial f_r[\bar{r}_o(\bar{r}_p)]}{\partial x_{co}}\ d\bar{r}_p,$$

-continued $$0<\gamma_y=\int_\sigma\frac{-d\bar{P}_{\perp hy}}{\partial f_r}\ \frac{\partial f_r[\bar{r}_o(\bar{r}_p)]}{\partial y_{co}}\ d\bar{r}_p.$$

It is now clear that to every radiation beam for which the flux density either decreases or increases monotonically everywhere with $|\bar{r}_o|$, a platform can be designed which will be horizontally stable around at least one point at each altitude in the beam.

To illustrate in more detail, consider a beam which is cylindrically symmetric around its axis, i.e., $f_r$ depends only on the magnitude of $\bar{r}_o$: $f_r(r_o)$. The radius of the beam is $R_o$ at the altitude where the platform is to be located. Let the platform be a section of a sphere of radius $R_s$. The platform is a dish facing down, its rim has a circumference $2\pi R$. Assume that the center of the platform is displaced from the axis of the beam by $\bar{x}_{co}$, along the horizontal x direction.

From the assumed symmetry it follows that $\bar{F}_{ph}$ will point along the x axis. To evaluate it, denote the cylindrical coordinates of a point on the platform surface by $r_p$ and $\phi$, where $r_p$ is the magnitude of $\bar{r}_p$ and $\phi$ is measured from the x axis. Whenever $f_r(r_o)$ is an even function of $r_o$, expansion in a power series in $r_o$, leads to:

$$f_r=a_o+a_1r_o^2+\ldots,$$

and one finds, using the relationship between $r_p$ and $r_o$, $$\partial f_r/\partial x_{co}=2a_1(r_p\cos\phi+x_{co}).$$

If $\partial P_\perp/\partial f_r$ is independent of $\phi$, only the first term in this expression will contribute to the integral.

Stability Against Tilting

When the platform is floating is an external net force field which points down (such as gravitation), then stability against titlting can be ensured[3] by suspending a bob. For example, when the platform is configured as shown in FIG. 4, suspending a bob from the rim of the dish in the manner in which a parachutist is suspended from his parachute, will insure stability. Similarly, if the net external force field points up (e.g., an electric field), then clearly, the same stability can be ensured if the bob is located above and attached to the rim of the dish in an "upside down parachute" configuration.

EMBODIMENTS

Increased Radiation Absorption in Thin Layers

Case A

An embodiment of this idea is illustrated in FIG. 18. A fragmentary cross-section of an object 104 consists of three layers. A lower surface layer 106, as viewed in the figure, is made of silver, beyond that is a layer of vacuum 108 followed by an upper layer of silver 110. Electromagnetic radiation whose wavelength in vacuum is $\lambda_o=0.3785$ μm, is incident normally (therefore $\theta=0°$) on the surface of layer 106. Since the second or inner layer is vacuum, $\lambda_2=\lambda_o$.

The complex index of refraction of silver at this wavelength is $\tilde{n}=n+ik$, where $n=0.05$ and $k=1.864$. With this, one calculates from the formula $$r_a(2,3) = \frac{-(\tilde{n}^2 - 1)[(\exp(i4\pi \tilde{n} d_s/\lambda_o)) - 1]}{(\tilde{n} - 1)^2[(\exp(i4\pi \tilde{n} d_s/\lambda_o))] - (\tilde{n} + 1)^2}$$

to obtain $\phi_r(2,3)=4.15$ rad, and analogously, $\phi_r(1,2)=4.28$ rad.

Therefore, one needs $$d_2=0.3785\ \mu m[-(8.43/2\pi)+(\text{int.})]\tfrac{1}{2}.$$

Choosing (int.)=2, one finds for $d_2$ the value $d_2=0.249\ \mu m\cdot(\tfrac{1}{2})=0.1245\ \mu m$.

Case B

The structure shown in FIG. 18 not only embodies Case A, but also Case B as will now be described. In this structure the selected layer is the first or lower layer 106, while the resonant layer is the second or inner layer 108. Thus, the selected layer is now placed next to the resonant layer.

The amplitude reflectances are calculated to be $r_a(2,3)=-0.5412-i\ 0.8145$, $r_a(1,2)=-0.2911-i\ 0.6352$, while the amplitude transmittance of the first layer is $t_a(1)=0.2940-i\ 0.1114$.

The fraction of the normally incident radiated power absorbed by the selected layer is given by $$F = 1 - |r_a(1,2)|^2 \left| 1 + \frac{(t_a(1)/r_a(1,2))^2\beta}{1-\beta} \right|^2 + |t_a(1)|^2 \frac{|r_a(2,3)|^2 - 1}{|1-\beta|^2},$$

where $\beta=r_{a2}r_{a4}\exp\{i2\cdot 2d_j/\lambda_o\}$.

One finds the result $F>80\%$

This is to be contrasted with the fraction of normally incident power absorbed at the same wavelength $\lambda_o$ on a simple slab of silver (i.e., in the absence of the layered structure) which would be only <2.5%, and even that small power would be absorbed over a depth more than $d_1$. Clearly, the appropriately designed layered structure increases absorption efficiency in the selected layer by a large factor.

Vertical Platform Stability

1. The radiation is emitted from the ground by an array of emitters (See FIG. 8). Each emitter is a laser, emitting radiation with wavelength $\lambda_o=0.5\ \mu m$. Each emitter has a radius $r_g=0.75$ cm. The ground array is circular, with a radius $R_g=49$ m.

The platform is to be kept in a stable equilibrium at an altitude $h_o=50$ km.

The radiation beam is brought to a focus at an altitude $h_f=49$ km.

At an altitude $h_o=50$ km. each partial beam emitted by a single ground emitter has a radius of (more precisely, the radius of the first Fresnel zone is) 2.0 m.

At altitude $h_f=49$ km., at the beam focus, the (aggregate) radiation beam has a radius $r_b(h_f)=2.0$ m.

The platform is the reflector described in Table I in the first column under (++−+), with $\epsilon_t=\epsilon_b=1$, $(a_{tb})_{eff}\geqq 0.88$, $\alpha_{Tt}\leqq 0.79$, $T_{sb}=1185°$ K., $T_{st}=1185°$ K., $T=190°$ K., $P_{rb}=4.39$ W, $P_{rt}=4.39$ W, $$[A_b(h_o)]^{-1}\frac{dA_b(h_o)}{dh} \approx \frac{2R_g/h_f}{r_b(h_f)\left[1 + \frac{R_g}{h_f}\ \frac{h_o - h_f}{r_b(h_f)}\right]},$$

$$[F_{pv}(h_o)]^{-1} f_r \frac{dF_{pv}(h_o)}{df_r} = 1.49.$$

The $\kappa_2$ is now negligible, and the restoring force for altitudes h near $h_o$ will be $$F_s(h-h_o) > F_{pv}(h_o)9.93\cdot 10^{-4}(h-h_o) + \text{higher order terms in } (h-h_o),$$

where h and $h_o$ are measured in meters. Thus, in this case a vertical force whose magnitude equals one percent of the platform weight, can be counteracted by a vertical platform displacement from $h_o$ of about 10 meters.

2. The situation is as just described under 1 above, except that now $h_f=h_o$. The values of $\lambda_o$, $\epsilon_b$, $\epsilon_t$, $r_g$, $R_g$, $h_o$, $r_b(h_f)$, $(\alpha_{Tb})_{eff}$, $\alpha_{Tt}$, $T_{sb}$, $T_{st}$, T, $P_{rb}$ and $P_{rt}$ are as given under 1.

Since now the beam is focused precisely at the altitude where the platform is to be located, vertical stability induced by beam focusing is not adequate. On the other hand, the density and temperature of the earth's atmosphere are known[(9)] as a function of altitude. (See FIG. 9). From that knowledge one concludes that the atmosphere will induce vertical stability at $h_o=50$ km for the platform under consideration. In particular, one finds $$\frac{\partial T_{sb}}{\partial h} = 0,\ \frac{\partial T_{st}}{\partial h} = 0$$

$$\frac{dT}{dh} < 0,\ -\frac{d\rho}{dh} > 10^{-4}\rho(\text{meter})^{-1},\ \kappa_2 << \kappa_1.$$

Then $$|\kappa_1| \geqq [F_{pv}(h_o)]^{-1}\left|\frac{\partial F_{pv}(h_o)}{\partial\rho}\ \frac{d\rho}{dh}\right| \geqq 10^{-4}(\text{meter})^{-1}.$$

The vertical restoring force will be $$-F_{sv}[h-h_o] \geqq F_{pv}(h_o)\cdot 10^{-4}(\text{meter})^{-1}(h-h_o) + \text{higher order terms in } (h-h_o).,$$

where h and $h_o$ are measured in meters.

Thus, a vertical force whose magnitude equals one percent of the platform weight can be counteracted by a vertical platform displacement from $h_o$ by about 100 meters.

Horizontal Platform Stability

The platform is kept afloat as a result of irradiation by a beam which may have uniform flux density in the vicinity of the platform. (For purposes of the following it is unimportant how that beam is generated. For example, it may be generated as was described in connection with beam induced vertical stability). When the flux density within the beam is not uniform, then it is assumed that the flux density peaks at the desired position of the center of the platform. This beam itself will have a tendency to maintain the platform in stable equilibrium. That stability will enhance the horizontal stability calculated below.

To ensure that the platform is in stable equilibrium at its desired position with respect to horizontal displacements, an additional radiation beam referred to as a "horizontal stabilizing beam" is also incident on the platform. (When the horizontal stabilizing beam is turned on, the intensity of the original beam is correspondingly reduced, so that the total lift force acting, exerted by the total incident beam (=original beam+horizontal stabilizing beam), on the platform remains unchanged). The horizontal stabilizing beam is emitted from the ground by an array of emitters similar to the array shown in FIG. 8. Each emitter is a laser, emitting radiation of wavelength $\lambda_o=0.5$ μm. Each emitter generates a beam of radius $r_g=0.75$ cm at emission.

The ground array is circular with a radius $r_g=96$ m.

The platform is to be kept in a stable equilibrium at an altitude of $h_o=50$ km.

The radiation beam is brought to a focus at an altitude of $h_f=48$ km (See FIG. 8).

At an altitude of 50 km, each partial beam emitted by a single ground emitter has a radius of (more precisely, the radius of the first Fresnel zone is) 2.0 m.

At an altitude of 48 km, at the beam focus, the (aggregate) radiation beam has a radius $r_b(h_f)=2.0$ m.

The platform is a reflector, constructed as described in Table I in the first column under (++−+), with $\epsilon_b=\epsilon_t=1$. The shape of the reflector is a section of a spherical surface of radius $R_s=2.0$ m, the radius of the circular rim is $R=0.25$ m. The total mirror weight is denoted as $F_{pv}$.

Near the platform, the flux density in the horizontal stabilizing beam depends only on the distance, $r_o$ from the beam axis, and can be written in terms of the two parameters $f_r(0)$ and $R_o$ as $$f_r(r_o) = f_r(0)\left[1 - \left(\frac{r_o}{R_o}\right)^2 + \ldots\right];$$

$$f_r(0) = 1.0\,\frac{W}{cm^2},\; R_o = 4.0 \cdot 10^2\text{cm}.$$

Then $(\alpha_{\perp b})_{eff} \geqq 0.88$, $(\alpha_{\perp t})_{eff} \leqq 0.79$,
$T_{sb}=1185°$ K., $T_{st}=1185°$ K.,
$P_{rb}=4.39$ W, $P_{rt}=4.39$ W,
$P_o \leqq 3.25 \cdot 10^{-2}$ W, and one finds $$\frac{\partial f_r(r_o)}{\partial x_{co}} = -f_r(0)2R_o^{-2}(x_{co} + r_p\cos\phi),$$

$$\frac{f_r}{P_r}\,\frac{\partial P_\perp}{\partial f_r} = 1.49$$

$$\gamma_x = \gamma_y = \int_{-\pi}^{+\pi} d\phi \int_0^R dr_p r_p \frac{r_p}{R_s}(\cos\phi)\frac{\partial P_\perp}{\partial f_r}\,\frac{\partial f_r(r_p,\phi)}{\partial x_{co}}$$

$$= 1.30 \cdot 10^{-4} F_{pv}(\text{meter})^{-1}.$$

In this case, a 2.0 m displacement of the platform from the beam axis can compensate for a horizontal force whose absolute value is $\leqq 2.6 \cdot 10^{-4}\,F_{pv}$.

Platform Construction

The net momentum transfer to a floating platform from the surrounding atmosphere can be calculated from Eq. (8), if one knows $\alpha_\perp$, $T_s$, T and the chemical composition and structure of all platform surfaces. Once the surface chemical composition and structure has been chosen and $T_s$ and T are given, then the nature of thin covering layers which may deposit from the atmosphere as well as the values of $\alpha_\perp$ are determined. With that information in hand, a floating platform can be designed as follows.

First, one calculates $P_\perp$ for all surfaces, and from that the total lift force, as well as the total net horizontal force (if any) exerted on the platform by the surrounding atmosphere. The lift force must not be less than the total weight of the platform.

Next, the heat transfer properties of the platform are determined. In particular, one calculates for each surface element the heat energy transmitted to the surrounding atmosphere; the heat energy radiated out; the heat energy transmitted by conduction through the platform structure to other surface elements of the platform; the heat energy transported to other parts of the platform by internal radiation between components of the platform; and if the platform contains cavities which enclose fluids, such as a residual atmosphere, then one also has to calculate the heat energy transported through conduction and convection by these fluids. In a properly designed platform the heat transfer properties will ensure that the desired values of $T_s$ and T will be maintained everywhere.

Table I summarizes the pertinent parameters of a variety of properly designed floating platforms.

Each platform described in that table has the shape of a face-down dish, the dish itself is a spherical shell, the sphere has radius $R_s$, and the radius of the dish rim is R. (See FIG. 4).

Whenever a surface is to be corrugated, it is assumed that all indentations or grooves are rectangular (as shown in FIG. 2), their width, $a_w$ equals the distance between neighboring grooves, $\Delta a_w$, and the depth of each groove, $a_h$ satisfies $a_h=4a_w=4\Delta a_w$.

The parameters and properties of tungsten and platinum surfaces are taken from references (4), (5), (6), (7) and (8). The first three of these references report the structure of P1(111) surfaces, in particular, the variation of the sticking coefficient and binding energy of oxygen on Pt(111) surfaces as a function of temperature and coverage; adsorption and desorption rates; the properties of an oxygen monolayer on Pt(111), the angular distributions of oxygen and nitrogen scattering on clean Pt(111) surfaces as well as Pt(111) surfaces covered to various extents by an oxygen surface layer; and the values of accommodation coefficients and momentum transfer properties on Pt(111) surfaces for clean surfaces as well as surfaces covered by an oxygen layer. References (7) and (8) report the properties of surface oxides on tungsten.

The parameters of Table I were calculated as follows. First, from the heat transfer properties of the atmosphere at the chosen altitude, $h_o$, and the surface temperatures $T_{st}$ and $T_{sb}$ the atmospheric temperature, T, and pressure, ρ, in the vicinity of the platform were calculated. For these temperatures and pressure, the fractional oxygen coverages were then evaluated for both the top and bottom surfaces, based on the reported values of the sticking coefficient, binding energies and desorption rates. Upper and lower limits for the accommodation coefficients were then calculated from the experimental data, for the fractional oxygen surface coverage appropriate for the bottom as well as the top surfaces. From these coefficients the lift force was evaluated, as well as the various heat energy flow rates. Everywhere in the table a lower limit on $|P_\perp|$ was used; the actual $|P_\perp|$ values are thus expected to be higher than the values listed in Table I. Finally, internal consistency of all design parameters was established, according to the criteria outlined above.

To calculate the heat exchange relationships within the platform, and between the platform and its environment, the following well known formulas were used.

The Stephan-Boltzmann law, which gives the heat flow radiated out per unit surface at temperature $T_s$, as $$P_r = \epsilon \cdot 5.66\ g \cdot 10^{12} \frac{W}{cm^2\,(°K)^4}\, T_s^4, \tag{14}$$

where $\epsilon$ is the surface emissivity, and $T_s$ is measured in °K. units. The heat flow per unit surface area at temperature $T_s$, to an adjacent gas at temperature T:

$$P_{cg} = \alpha_T \frac{\langle v \rangle}{2}\, \rho\, k\, (T_s - T), \tag{15}$$

and heat flow from a unit surface area at temperature $T_{s1}$, to a unit surface area at temperature $T_{s2}$, due to conduction through an interposed medium of thickness $\rho$, and thermal conductivity $\kappa$:

$$P_{cs} = k \frac{T_{s1} - T_{s2}}{P}. \tag{16}$$

It will thus be seen that an invention has been described which provides a method for applying a net force on an object placed in an atmosphere. The net force results from an imbalance in the net momentum transferred to the object by particles impinging at least two surface portions exposed to the atmosphere. This is useful in supporting or moving a platform in the atmosphere. A platform which can be used as a communication reflector or for carrying instrumentation may thus be supported in the atmosphere with relatively little, or even without artificial energy sources applied. While the invention has been particularly shown and described with reference to the foregoing preferred embodiments and to preferred methods of practicing the invention, it will be understood by those skilled in the art that other changes in form and detail may be made therein without departing from the spirit and scope of the invention as defined in the following claims.

TABLE I

List of Symbols (Many of the following symbols are illustrated in FIGS. 4–8.)

$T_{st}$: temperature of top ribbon surface $T_{sb}$: temperature of bottom ribbon surface T: temperature of atmosphere near ribbon surfaces $\rho$: particle density of atmosphere near ribbon surfaces $C_t$: chemical composition of top ribbon surface material (see FIG. 6)

$C_b$: chemical composition of bottom ribbon surface material (see FIG. 6)

$C_{mt}$: chemical composition of layer adjacent to top ribbon surface material (see FIG. 6)

$C_{mb}$: chemical composition of layer adjacent to bottom ribbon surface material (see FIG. 6)

$C_{mn}$, (n=1, 2, . . . ): chemical composition of intermediate layers as shown in FIG. 6

W: polycrystalline tungster

Pt: platinum (111) crystal surface

Ti: titanium h: mirror altitude $\langle v \rangle$: average speed of atmospheric particles near platform surface a,b: distance between center-lines of neighboring wires in mesh (FIG. 5)

$d_h$: width of ribbon shaped wire (FIG. 5)

R: radius of rim of spherical-shell dish-shaped platform (FIGS. 4 and 5)

$R_s$: radius of spherical shell of platform (FIGS. 4 and 5)

S: total bottom surface of all wires in mesh forming platform $P_{rt}$: total heat energy radiated out from the top surfaces of all wires in mesh $P_{rb}$: total heat energy radiated out from the bottom surfaces of all wires in mesh $P_{co}$: total conductive heat loss from bottom surfaces of all ribbons in mesh, to top surfaces of all ribbons in mesh $P_c$: conductive heat loss from top and bottom surfaces of all ribbons in mesh to surrounding atmosphere $P_{cig}$: conductive heat loss from bottom surfaces of all ribbons to top surfaces of all ribbons, due to internal gas conduction $P_{cis}$: conductive heat loss from bottom surfaces of all ribbons to top surfaces of all ribbons, due to conduction through heat insulating "bridges" which separate neighboring layers in ribbon.

$P_{ri}$: radiative heat loss from bottom surfaces of all ribbons, to top surfaces of all ribbons, due to internal radiation within ribbon $d_{vt}$: thickness of top surface layer (FIG. 6)

$d_{vb}$: thickness of bottom surface layer (FIG. 6)

$a_{ht}$: depth of rectangular grooves on top surface (FIG. 6)

$a_{hb}$ depth of rectangular grooves on bottom surface (FIG. 6)

$d_{mt}$: thickness of layer adjacent to top surface layer (FIG. 6)

$d_{mb}$: thickness of layer adjacent to bottom surface layer (FIG. 6)

$d_{mr}$: thickness of intermediate layer (if any) (FIG. 6)

$\Delta d_{mw}$: width of heat insulating brides. (FIG. 6)

$d_{mw}$: distance between neighboring heat insulating brides (FIG. 6)

d(b,1), d(1,t): height of heat insulating bridges between various layers (FIG. 6)

d(b,t): height of heat insulating bridge connecting layer whose thickness is denoted by $d_{mb}$ with layer whose thickness is denoted by $d_{mt}$.

$\kappa$: conductivity of material of which heat insulating bridges are made. (It is assumed that $\kappa \leqq 10^{-4}$ W/(cm°K.), and that the average density of the heat insulating material is $\leqq$4.5 g/cm$^3$)

$\epsilon_{mb}$, $\epsilon_{mt}$, $\epsilon_{mnb}$, $\epsilon_{mnt}$ (n=1, 2, . . . ): emissivity of shiny internal $\epsilon_b$, $\epsilon_t$: emissivity of bottom and top (external surfaces (see FIG. 6). In Table I they are assumed to have the same common value denoted by $\epsilon_m$.

$P_a$: total power absorbed by platform from radiation beam $P_\perp$: net perpendicular atmospheric momentum transferred per unit time to top and bottom surface of a section of wire whose bottom and top surface both have unit area, (with this definition, the lift force experienced by the platform is $P_\perp \cdot S$, whenever $P_\perp$ has the same value everywhere on the platform).

$m_l$: extra weight which can be lifted by platform.

$\nu_o$: vacuum wavelength of radiation which heats platform $r_g$: radius of ground emitter which emits radiation which heats platform.

TABLE I

| Symbol Indicating Ribbon Type | (+ + − +) | (− − + +) | (− − − +) | (+ + + −) | (+ + − −) | (+ − + −) | (+ − − −) | (− − + −) | (− − − −) |
|---|---|---|---|---|---|---|---|---|---|
| $T_{st}$ (°K) | 1185 1350 | 1185 1350 | 1185 1350 | 950 | 950 | 800 | 800 | 800 | 800 |
| $T_{sb}$ (°K) | 1185 1350 | 1185 1350 | 1185 1350 | 1185 | 1185 | 850 | 850 | 850 | 850 |
| $C_t$ | Pt | Pt | Pt | Pt | Pt | Pt | Pt | Pt | W |
| $C_b$ | Pt | W | W | Pt | Pt | Pt | Pt | W | Pt |
| $C_m$ | Ti | Ti | Ti | Ti | Ti | Ti | Ti | Ti | Ti |
| T (°K) | 190 | 190 | 190 | 1050 | 1070 | 825 | 826 | 826 | 824 |
| $<v>$ ($10^4$ cm/s) | 3.74 | 3.74 | 3.74 | 8.80 | 8.85 | 7.79 | 7.79 | 7.79 | 7.78 |
| h (km) | 76 | 76 | 76 | 45 | 45 | 50 | 50 | 50 | 50 |
| $\rho$ ($cm^{-3}$) | $4 \cdot 10^{14}$ | $4 \cdot 10^{14}$ | $4 \cdot 10^{14}$ | $3 \cdot 10^{16}$ | $3 \cdot 10^{16}$ | $3 \cdot 10^{16}$ | $3 \cdot 10^{16}$ | $3 \cdot 10^{16}$ | $3 \cdot 10^{16}$ |
| a=b (cm) | 1 | 1 | 1 | $1.33 \cdot 10^{-2}$ | $1.33 \cdot 10^{-2}$ | $1.33 \cdot 10^{-2}$ | $1.33 \cdot 10^{-2}$ | $1.33 \cdot 10^{-2}$ | $1.33 \cdot 10^{-2}$ |
| $d_h$ (cm) | $10^{-4}$ | $10^{-4}$ | $10^{-4}$ | $6.67 \cdot 10^{-3}$ | $6.67 \cdot 10^{-3}$ | $6.67 \cdot 10^{-3}$ | $6.67 \cdot 10^{-3}$ | $6.67 \cdot 10^{-3}$ | $6.67 \cdot 10^{-3}$ |
| R (cm) | 25 | 25 | 25 | 100 | 100 | 100 | 100 | 100 | 100 |
| $R_s$ (cm) | 200 | 200 | 200 | 400 | 400 | 400 | 400 | 400 | 400 |
| S ($cm^2$) | 0.393 | 0.393 | 0.393 | $2.36 \cdot 10^4$ | $2.36 \cdot 10^4$ | $2.36 \cdot 10^4$ | $2.36 \cdot 10^4$ | $2.36 \cdot 10^4$ | $2.36 \cdot 10^4$ |
| $d_{vt}$ (Å) | 400 | 400 | 400 | 400 | 400 | 400 | 400 | 400 | 2000 |
| $a_{ht}$ (Å) | 0 | 0 | 0 | 0 | 0 | 0 | 0 | 0 | 1600 |
| $d_{vb}$ (Å) | 2000 | 400 | 2000 | 400 | 400 | 400 | 2000 | 400 | 400 |
| $a_{hb}$ (Å) | 1600 | 0 | 1600 | 0 | 0 | 0 | 1600 | 0 | 0 |
| $d_{mt}$ (μm) | 0 | 0 | 0 | 10 | 10 | 2 | 2 | 2 | 2 |
| $d_{mb}$ (μm) | 0 | 0 | 0 | 10 | 10 | 2 | 2 | 2 | 2 |
| $d_{ml}$ (μm) | ≧0.248 ≧0.618 | 1.23 2.03 | ≧1.39 ≧2.25 | 10 | 10 | — | — | — | — |
| $d_{mw}$ (cm) | — | — | — | 0.323 | 0.323 | 0.323 | 0.323 | 0.323 | 0.323 |
| Δ $d_{mw}$ (cm) | — | — | — | 0.010 | 0.010 | 0.010 | 0.010 | 0.010 | 0.010 |
| d(b,l) (μm) | 0 | 0 | 0 | 8.39 | 8.39 | — | — | — | — |
| d(l,t) (μm) | 0 | 0 | 0 | 11,6 | 11,6 | — | — | — | — |
| d(b,t) (μm) | — | — | — | — | — | 10 | 10 | 10 | 10 |
| $P_{rt}$ (W) | $\epsilon_t 4.39$ $\epsilon_t 7.39$ | $\epsilon_t 4.39$ $\epsilon_t 7.39$ | $\epsilon_t 4.39$ $\epsilon_t 7.39$ | $\epsilon_t 1.09 \cdot 10^5$ | $\epsilon_t 1.09 \cdot 10^5$ | $\epsilon_t 5.47 \cdot 10^4$ | $\epsilon_t 5.47 \cdot 10^4$ | $\epsilon_t 5.47 \cdot 10^4$ | $\epsilon_t 5.47 \cdot 10^4$ |
| $P_{rb}$ (W) | $\epsilon_b 4.39$ $\epsilon_b 7.39$ | $\epsilon_b 4.39$ $\epsilon_b 7.39$ | $\epsilon_b 4.39$ $\epsilon_b 7.39$ | $\epsilon_b 2.63 \cdot 10^5$ | $\epsilon_b 2.63 \cdot 10^5$ | $\epsilon_b 6.97 \cdot 10^4$ | $\epsilon_b 6.97 \cdot 10^4$ | $\epsilon_b 6.97 \cdot 10^4$ | $\epsilon_b 6.97 \cdot 10^4$ |
| $P_{co}$ (W) | — | — | — | $\leqq 33.8 \cdot 10^3$ | $\leqq 33.8 \cdot 10^3$ | $9.49 \cdot 10^3$ | $9.50 \cdot 10^3$ | $9.50 \cdot 10^3$ | $9.49 \cdot 10^3$ |
| $P_c$ (W) | $\leqq 3.25 \cdot 10^{-2}$ $\leqq 3.64 \cdot 10^{-2}$ | $\leqq 4.03 \cdot 10^{-2}$ $\leqq 4.70 \cdot 10^{-2}$ | $\leqq 4.03 \cdot 10^{-2}$ $\leqq 4.70 \cdot 10^{-2}$ | $<<P_{co}$ | $<<P_{co}$ | $<<P_{co}$ | $<<P_{co}$ | $<<P_{co}$ | $<<P_{co}$ |
| $P_{cls}$ (W) | — | — | — | $\leqq 8.31 \cdot 10^3$ | $\leqq 8.31 \cdot 10^3$ | $\leqq 3.65 \cdot 10^3$ | $\leqq 3.65 \cdot 10^3$ | $\leqq 3.65 \cdot 10^3$ | $\leqq 3.65 \cdot 10^3$ |
| $P_{cig}$ (W) | — | — | — | $\leqq 9.82 \cdot 10^3$ | $\leqq 9.82 \cdot 10^3$ | $\leqq 9.68 \cdot 10^3$ | $\leqq 9.69 \cdot 10^3$ | $\leqq 9.69 \cdot 10^3$ | $\leqq 9.68 \cdot 10^3$ |
| $P_{ri}$ (W) | — | — | — | $\epsilon_m 3.87 \cdot 10^4$ | $\epsilon_m 3.87 \cdot 10^4$ | $\epsilon_m 7.51 \cdot 10^3$ | $\epsilon_m 7.51 \cdot 10^3$ | $\epsilon_m 7.51 \cdot 10^3$ | $\epsilon_m 7.51 \cdot 10^3$ |
| $P_a$ (kw) | $\leqq 8.82 \cdot 10^{-3}$ $\leqq 1.48 \cdot 10^{-2}$ | $\leqq 8.82 \cdot 10^{-3}$ $\leqq 1.48 \cdot 10^{-2}$ | $\leqq 8.82 \cdot 10^{-3}$ $\leqq 1.48 \cdot 10^{-2}$ | ≦372 | ≦372 | ≦124 | ≦124 | ≦124 | ≦124 |
| $\lvert P\perp \rvert_{cm^2}^{dynes}$ | ≧0.445 ≧0.609 | ≧0.724 ≧1.06 | ≧0.951 ≧1.31 | $1.78 \cdot 10^2$ | $1.97 \cdot 10^2$ | 14.8 | 15.3 | 15.2 | 15.5 |
| $m_l$ (kg) | — | — | — | ≧3.94 | ≧4.39 | ≧0.306 | ≧0.334 | ≧0.315 | ≧0.319 |
| $\lambda_o$ (μm) | 1 | 1 | 1 | 1 | 1 | 1 | 1 | 1 | 1 |
| $r_g$ (cm) | 2.28 | 2.28 | 2.28 | 1.35 | 1.35 | 1.50 | 1.50 | 1.50 | 1.50 |

REFERENCES (1) H. Wachman, *ARS Journal*, January 1962, p. 2.
(2) L. B. Thomas, *Rarefied Gas Dynamics*, (C. L. Brundin ed.), p. 155, Academic Press, New York, 1967
(3) P. L. Csonka, *Microwave Journal*, October 1979, p. 72, and *IEEE Transactions, Aerospace and Electronics Systems*, 19, 215 (1983).
(4) C. T. Campbell, G. Ertl, H. Kuipers, J. Segner, *Surface Science*, 107, 220 (1981).
(5) D. Auerbach, C. Becker, J. Cowin, and L. Wharton, *Applied Physics*, 14, 141 (1977).
(6) K. C. Janda, J. E. Hurts, J. Cowin. L. Wharton, D. J. Auerbach, *Surface Science*, 130, 395 (1983)
(7) C. T. Campbell, G. Ertl, J. Segner, *Surface Science*, 115, 309 (1982)
(8) D. A. King, T. E. Madey, J. T. Yates, Jr., *Journ. Chem. Physics*, 55, 3236 (1971)
(9) R. C. Whitten, I. G. Popoff, *Physics of the Lower Ionosphere*, Prentice Hall, New Jersey, 1965.

It is claimed and desired to secure by Letters Patent:

1. A method for freely suspending without any solid material support, a platform in an atmosphere comprising:
   transmitting selectively directed electromagnetic radiation forming an interference pattern from an antenna means;
   disposing a platform, having a selected surface structure, in the atmosphere in such a manner that said electromagnetic radiation impinges the platform;
   establishing a temperature difference between at least one surface portion of the platform and the atmosphere adjacent to the surface portion, by regulating the temperature distribution on the surface of the platform by heating at least the one surface portion of the platform by the impinging electromagnetic radiation;
   providing a platform having a structure for generating a net atmospheric particle momentum transfer from the atmosphere to the platform by said disposing and establishing;
   freely suspending, without any external solid material support, the platform in the atmosphere by means of the force generated during said generating of a net atmosphereic particle momentum particle transfer;
   locating the center of mass of the platform generally below the point of attack of the resultant force generated by the net atmospheric particle momentum transfer; and
   controlling the altitude of the platform by varying the intensity of the electromagnetic radiation impinging the platform.

2. The method of claim 1 wherein the platform is an antenna, and which further includes transmitting electromagnetic radiation signals by means of the antenna freely suspended in the atmosphere.

3. The method of claim 1 wherein said disposing further includes locating the platform at an altitude between about 10 kilometers and 200 kilometers.

4. The method of claim 1 wherein said transmitting includes transmitting from a plurality of antennas.

5. The method of claim 1 wherein said transmitting includes transmitting from an antenna means located on a nonairborne vehicle.

6. The method of claim 1 wherein said transmitting includes transmitting from an antenna means located on an airborne vehicle.

7. The method of claim 1 wherein said disposing includes disposing the platform generally above the antenna means, and said transmitting radiation generally upward from the antenna means and bringing the total electromagnetic radiation to focus generally below the platform.

8. The method of claim 7 wherein the platform includes a generally dish-shaped portion and said disposing includes orienting generally downwardly the concave face of the dish-shaped portion.

9. The method of claim 1 which further includes adjusting the lateral position of the platform by displacing the axis of the interference pattern of the electromagnetic radiation.

10. The method of claim 1 wherein said regulating includes establishing a substantially common temperature over substantially the entire surface of the platform.

11. The method of claim 1 wherein said providing includes providing a platform having one set of generally equally spaced parallel ribbons and a second set of ribbons intercepting generally transversely the ribbons in the one set.

12. The method of claim 1 wherein said regulating includes establishing an average temperature on those surfaces of the platform which are oriented generally downward to have an average temperature higher than the temperature of the surfaces oriented generally upward.

13. The method of claim 1 wherein said regulating includes establishing a temperature on at least one surface portion of the platform which is higher than the temperture of the surrounding atmosphere, and establishing a temperature on at least one other portion of the surface of the platform which is lower than that of the surrounding atmosphere, wherein the temperature of the surrounding atmosphere is the same temperature the atmosphere would have at the same location in the absence of the platform.

14. The method of claim 1 wherein said providing includes providing a platform having at least two surface portions appropriately disposed thereon, the surface structure on one of the portions being different from the other portion in such a manner that particles of the surrounding atmosphere impinging said one portion, on the average, make more collisions with the one portion before rebounding in a direction away from the one portion than particles impinging the other portion.

15. The method of claim 1 wherein said providing includes providing a platform having at least two surface portions appropriately disposed thereon, wherein the one surface portion has indentations and the other surface portion is comparatively smoother.

16. The method of claim 15 wherein said providing further includes providing the platform wherein the indentations are structured in such a manner that the mean path length travelled by a particle of the atmosphere from first impingement of the surface in an indentation to final collison prior to leaving the indentation is less than approximately three times the mean free path length of the particles in the surrounding atmosphere.

17. The method of claim 15 wherein said providing further includes providing a platform wherein the indentations have a typical depth and width of at least 10 angstroms and have a typical width of no more than about ten times the typical depth.

18. The method of claim 1 wherein said providing includes providing a platform comprising thermal insulation disposed between two surface portions.

19. The method of claim 1 wherein said transmitting includes transmitting radiation of a known wavelength, and said providing includes providing a platform having a plurality of material layers, the layers including at least a group of adjacent layers which are structured in a manner to make the electromagnetic radiation having a known wavelength substantially resonate within the group of adjacent layers, and to substantially penetrate the group of adjacent layers.

20. The method of claim 19 wherein said providing further includes providing the group of layers which are further structured, relative to the impinging electromagnetic radiation of a known wavelength,, so that the term $(4\pi k_s n_s d_s/\theta \cos \theta_s)$ is within an order of magnitude of unity, where $k_s$ is the imaginary part of the average effective complex index of refraction within the group of adjacent layers;

$n_s$ is the average number of times that the electromagnetic radiation of known wavelength is reflected within said group of adjacent layers before leaving the group of adjacent layers;

$d_s$ is the average effective thickness of the group of adjacent layers;

$\lambda_o$ is the wavelength in a vacuum of the electromagnetic radiation with a known wavelength; and $\theta_s$ is the average effective angle between the normal direction to the surface of the group of adjacent layers and the direction of propagation inside the group of layers of the electromagnetic radiation of a known wavelength.

21. The method of claim 1 wherein said providing includes providing a platform including instrumentation and said freely supporting includes freely supporting the instrumentation in the atmosphere.

22. A method for transmitting electromagnetic radiation signals through the atmosphere comprising:

disposing a generally dish-shaped electromagnetic radiation transmitting antenna in the presence of a selected electromagnetic radiation field in the atmosphere in such a manner that the radiation impinges the disposed antenna, at an altitude substantially between 10 km and 200 km;

regulating the temperature distribution of the surface of the disposed antenna by heating at least one portion of the disposed antenna by the impinging electromagnetic radiation;

by said regulating, establishing a temperature difference between at least one surface portion of the disposed antenna and the atmosphere adjacent to the one portion;

providing the disposed antenna with a structure for generating a net atmospheric particle momentum transfer from the atmosphere to the disposed antenna by said disposing and establishing, which structure includes at least two surface portions appropriately disposed thereon, one of said surface portions having indentations and the other surface portion being comparatively smoother than the one surface portion, so that particles of the surrounding atmosphere impinging the one portion, on the average, make more collisions with the one portion before rebounding in a direction away from the one portion, than particles impinging the other portion.

23. The method of claim 22 wherein said providing further includes providing the disposed antenna with the indentations structured in such a manner that the mean path length travelled by a particle of the atmosphere from first impingement with the surface in an indentation to final collision prior to leaving the indentation, is less than approximately three times the mean free path length of the particles in the surrounding atmosphere.

24. The method of claim 22 wherein said providing includes providing the disposed antenna with the indentations having a typical depth of at least ten angstroms and no more then about three times the mean free path length of the particles in the atmosphere, and having a typical width of no less than about ten angstroms and no more than about ten times the typical depth.

* * * * *